3,056,731
DEHYDROGENATION OF STEROIDS BY MICRO-
ORGANISMS OF THE GENUS MYCOCOCCUS
Masao Isono and Matazo Abe, Nishinomiya, Japan, assignors to Takeda Pharmaceutical Industries, Ltd., Osaka, Japan
No Drawing. Filed Aug. 18, 1959, Ser. No. 834,415
Claims priority, application Japan Aug. 22, 1958
6 Claims. (Cl. 195—51)

This invention relates to a process for preparing $\Delta^1$-dehydrosteroids by the use of microorganisms of the genus Mycococcus or enzyme produced by them.

For a long time the present inventors have been searching for those microorganisms which are able to form a double bond between the positions 1 and 2 in ring A of steroids, thereby producing $\Delta^1$-dehydrosteroids, and found that many microorganisms belonging to the genus Mycococcus, have excellent ability to achieve the desired purpose.

The present invention has been accomplished based on the new finding and further studies and relates to a process for preparing $\Delta^1$-dehydrosteroids which is characterized by bringing steroids belonging to the pregnane or androstane series, in which the positions 1 and 2 in the steroid skeleton are saturated with hydrogen, into contact with the culture of microorganisms belonging to the genus Mycococcus, or with the oxidase produced by the microorganisms.

The starting materials used in the method of this invention are those saturated or unsaturated steroids belonging to the pregnane or androstane series, in which the positions 1 and 2 in ring A are saturated with hydrogen and positions other than 1 and 2 may be substituted by an oxo, hydroxyl, halogeno, carboxyl, alkyl group or the like, and the hydroxyl group may be protected in the form of ether or ester and the oxo group in the form of ketal, hydrazone or semicarbazone.

Typical ones of these steroids are as follows.

Pregnane-3,20-dione
$\Delta^{4,11}$-pregnadiene-3,20-dione
$\Delta^4$-pregnene-3,20-dione
$\Delta^4$-pregnen-11 (or 12,14,17 or 21)-ol-3,20-dione
$\Delta^4$-pregnen-14 (or 17 or 21)-ol-3,11,20-trione
$\Delta^4$-pregnene-17,21-diol-3,20-dione
$\Delta^4$-pregnene-17,21-diol-3,11,20-trione
$\Delta^4$-pregnene-11,21-diol-3,20-trione
$\Delta^4$-pregnene-11,17,21-triol-3,20-dione
$\Delta^4$-pregnene-11,16,17,21-tetrol-3,20-dione
6 and/or 9-(di)fluoro-$\Delta^4$-pregnene-11,17,21-triol-3,20-dione
6-methyl-$\Delta^4$-pregnene-17,21-diol-3,11,20-trione
$\Delta^4$-pregnene-17,19,21-triol-3,20-dione
$\Delta^4$-pregnene-11,20,21-triol-3-one
Allopregnane-3,20-dione
Androstane-3,17-dione
$\Delta^4$-androsten-17-ol-3-one
$\Delta^4$ (or $\Delta^5$-androstene-3,17-dione)
$\Delta^4$-androstene-3,11,17-trione or their derivatives produced by changing their hydroxyl group into ester, ether, or halogenide and their oxo group into ketal, hydrazone, or semicarbazone.

As mentioned before, many microorganisms belonging to the genus Mycococcus can be used in the method of this invention, but it is desirable to select those microorganisms which have excellent catalytic activity for dehydrogenation.

Microorganisms especially suitable for the dehydrogenation of steroids are as follows, for example.

Mycococcus sp. IFO No. 3574

Mycococcus sp. IFO No. 3588
Mycococcus albus Krassilnikov
Mycococcus capsulatus Krassilnikov The names of the genus of the above microorganisms are all based on "Bergey's Manual of Determinative Bacteriology," 7th edition, published by The Williams & Wilkins Co., Baltimore, Md., U.S.A., in 1957. Those microorganisms which lack in species name were separated by the present inventors and deposited in Institute for Fermentation, Osaka, Osaka, Japan, under the number of IFO, respectively, and their microbial characteristics are as follows:

Mycococcus sp. IFO No. 3574—
  Cells round or ovoid, 1.0–1.2 microns in diameter, occurring singly, in pairs, in short chains, or in clumps. Sometimes rod-shaped cells also occur, particularly in liquid media. Non-motile. Gram-positive.
  Gelatin stab: No liquefaction.
  Agar slant: Filiform, translucent, moist growth, becoming pale pink.
  Broth: Faintly turbid.
  Litmus milk: No visible change.
  Potato: Moist pale pink growth.
  Indole not produced.
  Hydrogen sulfide not produced.
  No acid and gas from glucose.
  Starch not hydrolyzed.
  Methyl red and Voges-Proskauer tests negative.
  Citrates serve sole source of carbon.
  Nitrites produced from nitrates.
  Catalase-positive.
  Aerobic.

Mycococcus sp. IFO No. 3588—
  Cells round or ovoid, 0.8–1.0 micron in diameter, occurring singly, in pairs, in short chains, or in clumps. Sometimes rod-shaped cells also occur, particularly in liquid media. Non-motile. Gram-positive.
  Gelatin stab: Crateriform liquefaction.
  Agar slant: Filiform, translucent, moist growth.
  Broth: Faintly turbid.
  Litmus milk: Acid curd.
  Potato: Slimy, pale orange-yellow streak.
  Indole not produced.
  Hydrogen sulfide produced.
  Acid from glucose.
  Starch not hydrolyzed.
  Methyl red and Voges-Proskauer tests negative.
  Citrates serve sole source of carbon.
  Nitrites produced from nitrates.
  Catalase-positive.
  Aerobic.

In general, the incubation of microorganisms in this method is effected under the conditions of oxidizing fermentation.

Nutrient media suitable for the growth of microorganisms contain carbon source, nitrogen source assimilable by the microorganisms, and necessary inorganic salts. As carbon source are used glucose, sucrose, dextrin, starch, and glycerin, for example and as nitrogen source are employed nitrogen containing organic substances such as peptone, meat extract, casein, edamine, corn steep liquor, yeast, and yeast extract, organic compounds such as amino acids, ammonium salts of organic acids, urea, and inorganic nitrogen compounds such as nitrates and ammonium salts. Necessary inorganic salts are potassium phosphate, sodium chloride, magnesium sulfate, etc., and the media may contain such metals as copper, manganese, cobalt, and nickel. For a large scale run a liquid medium is convenient.

The incubation of microorganisms may be effected statically but it is more advantageous to conduct it under aerobic conditions such as submerged culture under aeration with shaking or stirring.

Contact of the material steroids with the culture of microorganisms or with their enzyme is effected by bringing the mycelium separated from the culture broth or the oxidase separated from the mycelium into contact with the material steroids, or by adding the material steroids to the medium at a proper stage of the incubation. In the latter case, the material is added at once or over a period as fine powder or as a solution or suspension in a suitable solvent such as methanol, ethanol, ethylene glycol, propylene glycol, dimethylformamide, dioxane, and water, or as a solution or suspension containing a surface active agent or a dispersing agent. The pH of the substrate solution, incubation temperature, incubation time, and other conditions are different depending on the kind and quantity of the starting steroids and the kind of microorganisms used, and therefore optimal conditions are selected in each case. In general, however, the incubation is conducted at pH 6–9, 25–30° C. for 3–50 hours, but these conditions are not necessarily specific.

According to the kind of microorganisms, their activities are different. If the incubation is carried out too long, using a strain of a microorganism with strong activity, the $\Delta^1$-dehydrosteroids once accumulated are decomposed resulting in a poor yield. Therefore, the most important factor for obtaining good yield of $\Delta^1$-dehydrosteroids is incubation time, and in general less than 24 hours is preferable.

The $\Delta^1$-dehydrosteroids thus accumulated in the culture broth can be separated by various methods. For example, they are first adsorbed on a proper adsorbent such as alumina, magnesium silicate, or active carbon and then eluted with a suitable solvent such as methanol or ethanol, or directly extracted with a solvent immiscible with water such as chloroform, methylene chloride, or ethylene chloride, or subjected to counter current distribution. Or they are separated by chromatography using alumina, silica gel, cellulose, or pulp as carrier, or utilizing their difference in solubility in various solvents, or leading them to their functional derivatives with Girard reagent T or P or with a lower aliphatic acid anhydride and a deacidating agent.

The products of the present invention, $\Delta^1$-dehydrosteroids, are useful, for example, as medicines having activities of cortical hormones and/or sexual hormones, or as intermediates for producing such medicines.

*Example 1*

A strain of Mycococcus sp. IFO No. 3574 is inoculated into 500 cc. of nutrient medium constituted by a solution of 15 g. of polypeptone, 7.5 g. of meat extract, and 3 g. of $KH_2PO_4$ in 1.5 l. of tap water and adjusted to pH 7.0, in a 2 l. culture flask and incubated at 28° C. for 24 hours with shaking. A solution of 500 mg. of $\Delta^4$-pregnene-11$\beta$,17$\alpha$,21-triol-3,20-dione in 20 cc. of dioxane is added and the incubation is continued for additional 20 hours under the same conditions. The culture broth is extracted four times with 500 cc.-portions of ethyl acetate and the extract, after being washed with 500 cc. of 1% sodium carbonate solution and 500 cc. of distilled water successively, is evaporated under reduced pressure. The residue is dissolved in 100 cc. of 20% methanol and the solution, after being washed with 500 cc. of petroleum ether, is again extracted four times with 100 cc.-portions of ethyl acetate. The extract is dried over anhydrous sodium sulfate and concentrated under reduced pressure, and the separated crystals are recrystallized from ethyl acetate to give 230 mg. of $\Delta^{1,4}$-pregnadiene-11$\beta$,17$\alpha$,21-triol-3,20-dione.

The strain used in this example is deposited in Institute for Fermentation, Osaka, and ATCC with numbers of IFO–3574 and ATCC–13556, respectively.

*Example 2*

A strain of Mycococcus sp. IFO No. 3574 is inoculated into 500 cc. of the same nutrient medium as in Example 1 in each of three 2 l.-culture flasks and incubated at 28° C. for 24 hours with shaking. A solution of 100 mg. of $\Delta^4$-pregnene-11$\beta$,17$\alpha$,21-triol-3,20-dione in 4 cc. of ethanol is added to each medium and the incubation is continued for additional 4 hours under the same conditions. The culture broth is treated in the same manner as in Example 1 to give 165 mg. of $\Delta^{1,4}$-pregnadiene-11$\beta$,17$\alpha$,21-triol-3,20-dione.

*Example 3*

A 300 mg.-portion of $\Delta^4$-pregnene-11$\beta$,17$\alpha$,21-triol-3,20-dione is oxidized with a strain of Mycococcus sp. IFO No. 3588 and the same conditions as in Example 1. The culture broths are combined and extracted four times with 300 cc.-portions of ethyl acetate and the extract is concentrated under reduced pressure to give a brown residue. The residue is dissolved in 100 cc. of methanol and the solution is decolorized with 1.0 g. of active carbon and evaporated to give 186 mg. of $\Delta^{1,4}$-pregnadiene-11$\beta$, 17$\alpha$,21-triol-3,20-dione.

The strain used in this example is deposited in Institute for Fermentation, Osaka, and ATCC with members of IFO–3588 and ATCC–13557, respectively.

*Example 4*

A 500 mg.-portion of $\Delta^4$-pregnene-17$\alpha$,21-diol-3,20-dione is oxidized with a strain of Mycococcus sp. IFO No. 3574 under the same conditions as in Example 2 and the reaction mixture is treated in the same manner as in Example 3 to give 120 mg. of $\Delta^{1,4}$-pregnadiene-17$\alpha$,21-diol-3,20-dione.

$\Delta^4$-pregnene-17$\alpha$,21-diol-3,11,20-trione, $\Delta^4$-pregnene-11$\beta$,21-diol-3,20-dione, $\Delta^4$-pregnene-3,20-dione, or 9$\alpha$-fluoro-$\Delta^4$-pregnene-11$\beta$,17$\alpha$,21-triol-3,20-dione can be oxidized in a similar way to the above to produce $\Delta^{1,4}$-pregnadiene-17$\alpha$,21-diol-3,11,20-trione, $\Delta^{1,4}$-pregnadiene-11$\beta$,21-diol-3,20-dione, $\Delta^{1,4}$-pregnadiene-3,20-dione or 9$\alpha$-fluoro-$\Delta^{1,4}$-pregnadiene-11$\beta$,17$\alpha$,21-triol-3,20-dione, respectively.

The above examples represent presently-preferred illustrative embodiments of the invention, and in these examples, "cc." stands for cubic centimeters, "g." stands for grams, "mg." for milligrams, and "l." for liters.

Having thus disclosed the invention what is claimed is:

1. A process which comprises bringing a compound selected from the group consisting of steroids of the pregnane and androstane series, in which at least the positions 1 and 2 are saturated, into contact with an enzyme system of an oxidase-producing microorganism of the genus Mycococcus.

2. A process which comprises bringing a compound selected from the group consisting of steroids of the pregnane and androstane series, in which at least the positions 1 and 2 are saturated, into contact with an enzyme system of a microorganism selected from the group consisting of Mycococcus sp. (IFO–3574; ATCC–13556) and Mycococcus sp. (IFO–3588; ATCC–13557), thereby introducing a double bond between the positions 1 and 2 of the steroid and producing the corresponding $\Delta^1$-steroid.

3. The process claimed in claim 2, wherein the starting steroid compound is selected from the group consisting of pregnane-3,20-dione, $\Delta^{4,11}$-pregnadiene-3,20-dione, $\Delta^4$-pregnene-3,20-dione, $\Delta^4$-pregnen-11-ol-3,20-dione, $\Delta^4$-pregnen-12-ol-3,20-dione, $\Delta^4$-pregnen-14-ol-3,20-dione, $\Delta^4$-pregnen-17-ol-3,20-dione, $\Delta^4$-pregnen-21-ol-3,20-dione, $\Delta^4$-pregnen-14-ol-3,11,20-trione, $\Delta^4$-pregnen-17-ol-3,11,20-trione, $\Delta^4$-pregnen-21-ol-3,11,20-trione, $\Delta^4$-pregnene-17,21-diol-3,20-dione, $\Delta^4$-pregnene-17,21-diol-3,11,20-trione, $\Delta^4$-pregnene-11,21-diol-3,20-dione, $\Delta^4$-pregnene-11,17,21-triol-3,20-dione, $\Delta^4$-pregnene-11,16,17,21-tetrol-3,20-dione, 6-(di)fluoro-$\Delta^4$-pregnene-11,17,21-triol-3,20-dione, 9-(di)fluoro-$\Delta^4$-pregnene-11,17,21-triol-3,20-dione, 6-methyl-Δ⁴-pregnene-17,21-diol-3,11,20-trione, Δ⁴-pregnene-17,19,21-triol-3,20-dione, Δ⁴-pregnene-11,20,21-triol-3-one, allopregnane-3,20-dione, androstane-3,17-dione, Δ⁴-androsten-17-ol-3-one, Δ⁴-androstene-2,17-dione, Δ⁵-androstene-3,17-dione, and Δ⁴-androstene-3,11,17-trione.

4. A process for converting Δ⁴-pregnene-11β,17α,21-triol-3,20-dione into Δ¹,⁴-pregnadiene-11β,17α,21-triol-3,20-dione, which comprises bringing the former into contact with an enzyme system of Mycococcus sp. (IFO–3574; ATCC–13556), whereby a double bond is introduced between the positions 1 and 2 to yield the said Δ¹,⁴-compound.

5. A process for converting Δ⁴-pregnene-11β,17α,21-triol-3,20-dione into Δ¹,⁴-pregnadiene-11β,17α,21-triol-3,20-dione, which comprises bringing the former into contact with an enzyme system of Mycococcus sp. (IFO–3558; ATCC–13557), whereby a double bond is introduced between the positions 1 and 2 to yield the said Δ¹,⁴-compound.

6. A process for converting Δ⁴-pregnene-17α,21-diol-3,20-dione into Δ¹,⁴-pregnadiene-17α,21-diol-3,20-dione, which comprises bringing the former into contact with an enzyme system of Mycococcus sp. (IFO–3574; ATCC–13556), whereby a double bond is introduced between the positions 1 and 2 to yield the said Δ¹,⁴-compound.

References Cited in the file of this patent

UNITED STATES PATENTS

| | | |
|---|---|---|
| 2,844,513 | Wettstein et al. | July 22, 1958 |
| 2,905,592 | Skull et al. | Sept. 22, 1959 |
| 2,908,696 | Nussbaum et al. | Oct. 13, 1959 |

FOREIGN PATENTS

| | | |
|---|---|---|
| 550,906 | Belgium | Sept. 29, 1956 |